United States Patent
Wu et al.

(10) Patent No.: US 11,407,684 B1
(45) Date of Patent: Aug. 9, 2022

(54) WATER-RESISTANT LONG-ACTING INORGANIC ZINC OXIDE SUPER-HYDROPHILIC PAINT, PREPARATION METHOD AND APPLICATION THEREOF

(71) Applicant: Guangzhou University, Guangzhou (CN)

(72) Inventors: Xu Wu, Guangzhou (CN); Guangming Liu, Guangzhou (CN); Xiubin Xu, Guangzhou (CN); Danfeng Yu, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 17/468,987

(22) Filed: Sep. 8, 2021

(30) Foreign Application Priority Data

Apr. 6, 2021 (CN) .......................... 202110369229.2

(51) Int. Cl.
| | | |
|---|---|---|
| *C04B 28/26* | (2006.01) | |
| *C04B 14/30* | (2006.01) | |
| *C04B 111/74* | (2006.01) | |
| *C04B 111/00* | (2006.01) | |
| *C04B 103/40* | (2006.01) | |

(52) U.S. Cl.
CPC .............. *C04B 28/26* (2013.01); *C04B 14/30* (2013.01); *C04B 2103/40* (2013.01); *C04B 2111/00482* (2013.01); *C04B 2111/74* (2013.01)

(58) Field of Classification Search
CPC ..... C04B 14/30; C04B 28/26; C04B 2103/40; C04B 2111/00482; C04B 2111/74
See application file for complete search history.

(56) References Cited

FOREIGN PATENT DOCUMENTS

| CN | 109761576 A | * | 5/2019 |
| CN | 111393882 A | * | 7/2020 |

* cited by examiner

*Primary Examiner* — Anthony J Green
(74) *Attorney, Agent, or Firm* — Getech Law LLC; Jun Ye

(57) ABSTRACT

The disclosure relates to a field of functional coating technologies, and particularly to a durable inorganic super-hydrophilic paint, a preparation method and an application thereof. The durable inorganic super-hydrophilic paint includes the following preparation raw materials in percentage by mass: 30~60% silicate, 5~25% zinc oxide, 10~40% water and 0.1~5% wetting agent. The coating formed by a durable inorganic super-hydrophilic paint prepared by the method is a flat rigid coating, with good appearance, excellent antifouling self-cleaning and anti-microbial adhesion properties, long-term underwater stability and high mechanical strength. The paint may be applied to building external walls and home inner walls for its antifouling self-cleaning property and may be applied to a field of oil field and oil-water separation for its excellent underwater oleophobic property.

5 Claims, 2 Drawing Sheets

WATER-RESISTANT LONG-ACTING INORGANIC ZINC OXIDE SUPER-HYDROPHILIC PAINT, PREPARATION METHOD AND APPLICATION THEREOF

TECHNICAL FIELD

The disclosure relates to a field of functional coating technologies, and particularly to a water-resistant long-acting inorganic zinc oxide super-hydrophilic paint, a preparation method and an application thereof.

BACKGROUND

With rapid development of a field of special functional surfaces, superwetting surface gradually becomes one of its important components. The self-cleaning property of the super-hydrophilic surface in the air is most prominent, and the magnitude of the contact angle of the liquid on the solid surface is typically configured to represent infiltration degree of the liquid on the solid surface. Super hydrophilicity generally refers to that water drop may completely infiltrate the surface of the material so that the contact angle is less than 10°. The design of superwetting surface mostly refers to many superwetting phenomena present in the nature, and current researches on some biomimetic materials are also inspired by the superwetting phenomenon of some animals and plants in the nature. For example, edge and rim of nepenthes has a super-hydrophilic property due to its microscopic surface with a rough microstructure and having a viscous hydrophilic liquid film. Spider silk spouted by some terrestrial animals such as spiders is super-hydrophilic. The super-hydrophilic property of spider silk and laplace pressure generated by the silk shape enable the moisture of the surrounding environment to be transported to the spider body continuously and directionally through the spider silk, which plays a role in reducing water transport resistance in the directional transportation of water.

With the increasing attention of modern society on environmental protection and the change of living environment, people have higher requirements for degree of cleanliness and degree of environmental protection of the living environment. It can be found that an inorganic super-hydrophilic paint is one of the effective means to solve the problem in pursuit of environmental protection and efficient self-cleaning. One of mechanisms of a super-hydrophilic paint is: Micro-nano-size roughness is constructed on the surface of the hydrophilic substance. When water drop contacts the hydrophilic surface with micro-nano-size roughness, water drop may spread on the solid surface first and then penetrate into the micro-nano-size rough structure, and the remaining water completely spreads on the surface of the water film in order to make the whole system in an energy balance state.

Even though the current organic super-hydrophilic paint exhibits an excellent self-cleaning property in the fields of antifouling self-cleaning, anti-microbial adhesion and anti-fog, the complexity of preparation of the micro-nano structure, the fragility of the structure and the damage of the organic volatile monomer group on the environment may limit the development in the self-cleaning field.

SUMMARY

In order to solve the shortcomings of the related art, the primary purpose of the disclosure is to provide a water-resistant long-acting inorganic zinc oxide super-hydrophilic paint.

Another purpose of the disclosure is to provide a method for preparing the above water-resistant long-acting inorganic zinc oxide super-hydrophilic paint.

Another purpose of the disclosure is to provide an application of the above water-resistant long-acting inorganic zinc oxide super-hydrophilic paint in the fields of antifouling self-cleaning, anti-microbial adhesion and anti-fog.

The purpose of the disclosure may be implemented by the following scheme:

A water-resistant long-acting inorganic zinc oxide super-hydrophilic paint includes the following preparation raw materials in percentage by mass:
silicate: 30~60%,
zinc oxide: 5~25%,
water: 10~40%,
wetting agent: 0.1~5%.

Preferably, in the preparation raw materials of the water-resistant long-acting inorganic zinc oxide super-hydrophilic paint, the silicate is preferably 30~50%, the zinc oxide is preferably 15~25%, the water is preferably 10~30% and the wetting agent is preferably 0.5~2%.

More preferably, the water-resistant long-acting inorganic zinc oxide super-hydrophilic paint includes the following preparation raw materials in percentage by mass:
silicate: 50%,
zinc oxide: 25%,
water: 24%,
wetting agent: 1%.

The silicate is at least one of sodium silicate, potassium silicate, sodium potassium silicate, lithium silicate and aluminum silicate; preferably sodium silicate. The silicate contains alkali metal ions soluble in water that may be dissociated in water, and the content of the silicate has a great influence on water resistance of the paint. The silicate is preferably 35~50% of the total amount of the paint, and the content of the silicate should be no more than 50% of the total amount of the paint. Excess silicate may affect water resistance of the paint, resulting in poor water resistance of the coating.

The zinc oxide is at least one of zinc oxide with a particle size of 100 μm, zinc oxide of 50 μm, zinc oxide of 500 nm, and zinc oxide of 100 nm5; preferably zinc oxide of 100 nm5. Zinc oxide serves as filler, with bonding, water resistance, washing resistance and stain resistance, to help improve the mechanical strength and durability of the material.

The wetting agent is at least one of sodium dodecyl sulfate, sodium lauryl sulfate, sodium laurate, cetyl trimethyl ammonium bromide, fatty alcohol polyoxyethylene ether and dodecyl betaine; preferably sodium dodecyl sulfate. The wetting agent is an organic component having a property of promoting extended wetting of paint on various types of substrates, which helps improve coating and wide applications of the paint.

A method for preparing the above water-resistant long-acting inorganic zinc oxide super-hydrophilic paint includes the following blocks:
first adding the wetting agent in water to stir and mix well, then adding the zinc oxide into a solution containing the wetting agent to obtain an evenly dispersed white solution, finally adding silicate to stir and mix well to obtain a durable inorganic zinc oxide super-hydrophilic paint.

An application of the water-resistant long-acting inorganic zinc oxide super-hydrophilic paint in the fields of antifouling self-cleaning, anti-microbial adhesion and anti-fog.

A super-hydrophilic wear-resistant coating is prepared by coating the water-resistant long-acting inorganic zinc oxide super-hydrophilic paint on a substrate and curing.

The mechanism of the disclosure:

Under the normal temperature mixing condition, silicate with excellent permeability may penetrate between zinc oxide, and silicate and zinc oxide form an alternative-O—Si—O— polysiloxane network by condensation polymerization of sodium silicate. The zinc oxide particles are firmly embedded in a siloxane network, which not only improves interface interaction among zinc oxide particles to form a rough structure, but also enhances a binding force between the zinc oxide particles and the substrate. The coating is chemically bonded and integrated with the substrate so that it is generally not considered as a film-forming coating and has become a coating of the substrate in essence. Meanwhile, since silicate and zinc oxide are inorganic high surface energy compounds with excellent hydrophilic properties, the coating formed in this way has an excellent super-hydrophilic self-cleaning property and zinc oxide serves as a filler to further enhance the overall mechanical property and durability of the coating.

Compared with the related art, the disclosure has the following beneficial effects:

The coating formed by the durable inorganic super-hydrophilic paint prepared by the method is a flat rigid coating, with good appearance, excellent antifouling self-cleaning and anti-microbial adhesion properties, long-term underwater stability and high mechanical strength. The paint may be applied to building external walls and home inner walls for its antifouling self-cleaning property and may be applied to a field of oil field and oil water separation for its excellent underwater oleophobic property.

The coating formed by the durable inorganic super-hydrophilic paint prepared by the disclosure is up to 9H in hardness, with good wear resistance. The coating still has good super-hydrophilic and underwater super-oleophobic properties after 1000 friction cycles, free of defects and peeling off.

The durable inorganic super-hydrophilic paint prepared by the method is characterized by environmental protection, long-term underwater stability, etc. It is suitable for surface treatment of various metals, glasses and ceramics, and particularly for painting of inner and outer walls of buildings and oil-water separation of oil fields, with an excellent antifouling self-cleaning property on the wall to keep wall clean, which satisfies people's high requirements for environmental protection and self-cleaning properties of buildings.

DETAILED DESCRIPTION

Figure 1:
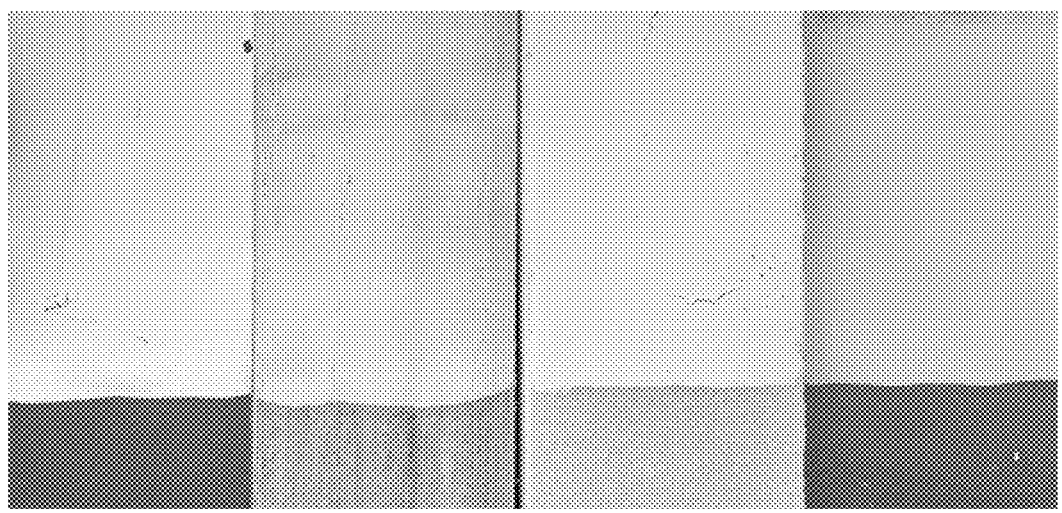
FIG. 1 is a physical diagram of coating A.

The present disclosure is further described in detail below in combination with embodiments and drawings, however, implementations of the disclosure are not limited here.

The reagents as used in embodiments are commercially available from the market unless otherwise noted.

The durable inorganic super-hydrophilic paint in the embodiments includes the following preparation raw materials in percentage by mass:

silicate: 30~50%, zinc oxide: 15~25%, water: 10~30%, wetting agent: 0.5~1.5%. The silicate is at least one of sodium silicate, potassium silicate, sodium potassium silicate, lithium silicate and aluminum silicate; preferably sodium silicate.

The oxide is at least one of zinc oxide with a particle size of 100 μm, zinc oxide of 50 μm, zinc oxide of 500 nm, and zinc oxide of 100 nm5; preferably zinc oxide of 500 nm.

The wetting agent is at least one of sodium dodecyl sulfate, sodium lauryl sulfate, sodium laurate, cetyl trimethyl ammonium bromide, fatty alcohol polyoxyethylene ether and dodecyl betaine; preferably sodium dodecyl sulfate; preferably sodium dodecyl sulfate.

The method for preparing a durable inorganic super-hydrophilic paint in embodiments is: first adding the wetting agent in distilled water to stir and mix well, then adding the zinc oxide into a solution containing the wetting agent and stir at high speed to obtain an evenly dispersed white solution, dropwise adding the silicate to stir and mix evenly to obtain a durable inorganic super-hydrophilic paint.

Embodiment 1

The embodiment provides a durable inorganic super-hydrophilic paint product having an inorganic super-hydrophilic and underwater super-oleophobic coating formed by the above inorganic super-hydrophilic paint on the surface.

Four durable inorganic super-hydrophilic paints A~D are prepared according to the proportioning ratio of Table 1; the particle size of the zinc oxide is 500 nm, and the wetting agent is sodium dodecyl sulfate.

TABLE 1

Proportion Details of Paints A~D

| Component Name | A | B | C | D |
|---|---|---|---|---|
| Sodium silicate | 50% | 60% | 45% | 50% |
| Zinc Oxide | 25% | 15% | 25% | 25% |
| Water | 24% | 24% | 29% | 23% |
| Wetting Agent | 1% | 1% | 1% | 2% |

Paints A~D are dip coated on a 120 mm×150 mm glass panel. The coating property is detected by first baking at a low temperature (50° C.) for 10 min and then baking at a high temperature (for example, 220° C.) for 30 min. The results are shown in Table 2.

TABLE 2

Coating Properties Prepared by Paints A~D

| Coating Property | A | B | C | D |
|---|---|---|---|---|
| coating appearance | white, flat | white, flat | white, flat | white, flat |
| Pencil Hardness | 9H | 9H | 9H | 9H |
| Water Contact Angle | 5° | 4° | 6° | 4° |
| Underwater Oil Contact Angle | 156° | 160° | 155° | 162° |
| Coating Appearance After 1000 Friction Cycles (Non-Woven Fabrics, 100 g Weight) | flat without scratches | flat without scratches | flat with slight scratches | flat without scratches |

From the above property detection results, the coating appearance formed by the paints A~D is white and transparent, with qualified super hydrophilicity. The water contact angle of coating A is 5°, with a good self-cleaning property, and the coating remains intact and changed little after 1000 times of frictions, indicating that the coating has high wear resistance, and the coating remains flat and intact without powder falling off after being soaked in distilled water for 7 days, indicating that the coating has good underwater stability. It is critical to strictly control the content of the silicate in the paint system since the water resistance of coating B is lower than other samples caused by the relatively high silicate content.

FIG. 1 is a physical diagram of coating A. As can be seen from the figure, the prepared durable inorganic super-hydrophilic coating forms a white coating with good appearance on a substrate and a good bonding capability for the substrate.

Figure 2:
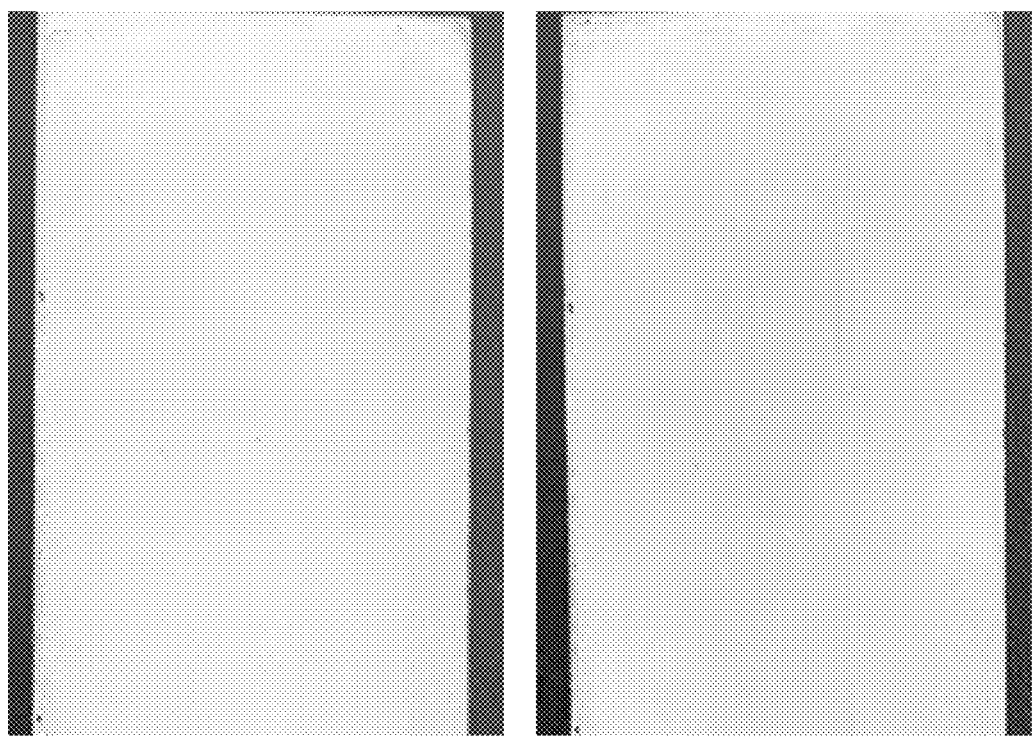
FIG. 2 is a physical diagram of coating A before (left image) and after 1000 friction cycles under a load of 100 g weight.

FIG. 2 is a physical diagram of coating A before and after 1000 friction cycles under a load of 100 g weight. As can be seen from the figure, after 1000 friction cycles, the appearance remains white and flat without scratches, indicating that the coating has excellent wear resistance.

Figure 3:
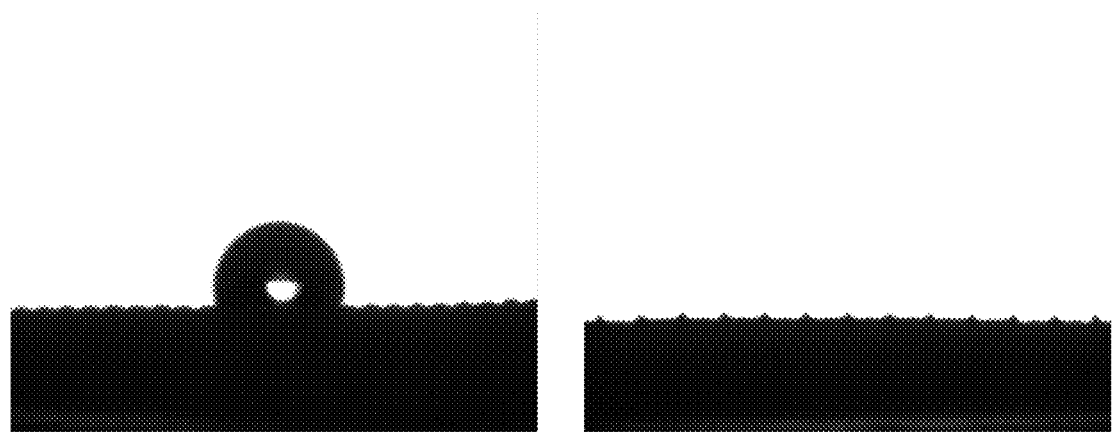
FIG. 3 is a diagram of a super-hydrophilic contact angle of coating A, the left image being before coating and the right image being after being coating.

FIG. 3 is a diagram of differences of contact angles before and after coating A coats on a hydrophobic stainless steel mesh. As can be seen from the figure, the water contact angle on the stainless steel net before coating is 113±6°, in a hydrophobic state, and the water contact angle on the stainless steel net after coating is almost 0°, indicating that the coating has excellent super-hydrophilic and self-cleaning properties.

Figure 4:
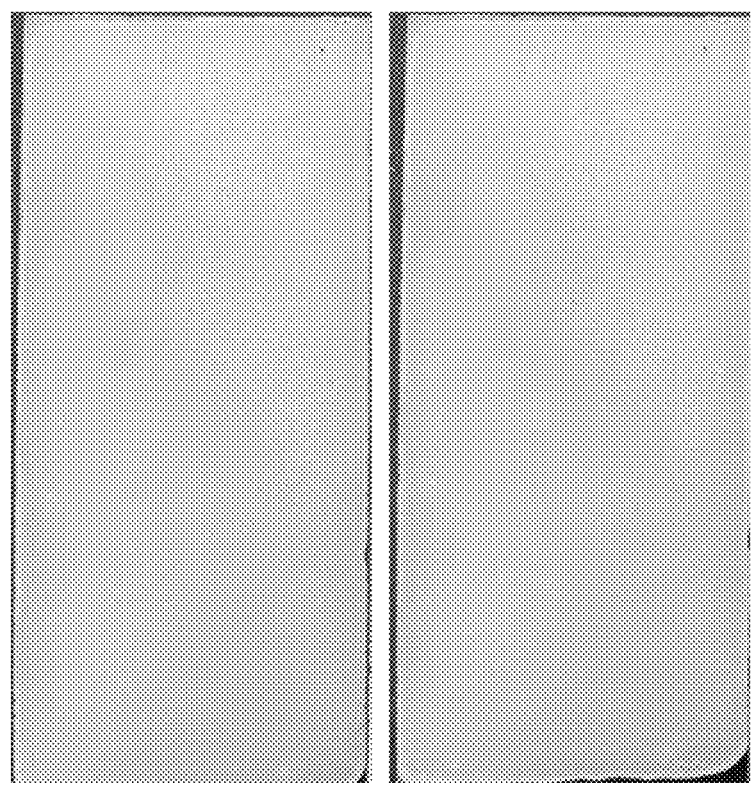
FIG. 4 is a physical diagram of coating A after being soaked in distilled water environment for 7 days, the left image being before being soaked and the right image being after being soaked.

FIG. 4 is a physical diagram of coating A after being soaked in distilled water environment for 7 days. The coating appearance remains white and flat, and almost unchanged, indicating that coating A has good underwater stability.

The above embodiments are preferred embodiments of the present disclosure, however, implementations of the invention are not limited by the above embodiments, and any other changes, modifications, substitutions, combinations and simplifications not departing from the spirit and principles of the disclosure should be equivalent replacements and included in the protection scope of the present disclosure.

What is claimed:

1. A water-resistant long-acting inorganic zinc oxide super-hydrophilic paint, comprising the following preparation raw materials in percentage by mass:
   silicate: 50%,
   zinc oxide: 25%,
   water: 24%,
   wetting agent: 1%.

2. The paint of claim 1, wherein,
   the silicate being at least one of sodium silicate, potassium silicate, sodium potassium silicate, lithium silicate and aluminum silicate.

3. The paint of claim 1, wherein, the zinc oxide being at least one of zinc oxide with a particle size of 100 μm, zinc oxide of 50 μm, zinc oxide of 500 nm, and zinc oxide of 100 nm.

4. The paint of claim 1, wherein,
   the wetting agent being at least one of sodium dodecyl sulfate, sodium lauryl sulfate, sodium laurate, cetyl trimethyl ammonium bromide, fatty alcohol polyoxyethylene ether and dodecyl betaine.

5. A method for preparing a water-resistant long-acting inorganic zinc oxide super-hydrophilic paint, comprising:
   providing preparation raw materials in percentage by mass:
   silicate: 50%,
   zinc oxide: 25%,
   water: 24%, and
   wetting agent: 1%
   adding the wetting agent in water to stir and mix well,
   adding the zinc oxide into a solution containing the wetting agent to obtain an evenly dispersed white solution, and
   adding silicate to stir and mix well to obtain a water-resistant long-acting inorganic zinc oxide super-hydrophilic paint.

* * * * *